July 23, 1946.  W. P. HILL  2,404,575
METHOD OF MANUFACTURING FINNED TUBES WITH
SUPPORT ENGAGING BEARING PORTIONS
Filed June 21, 1943
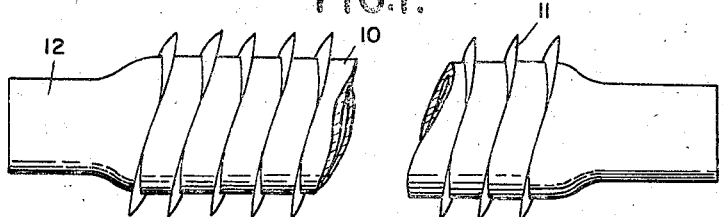
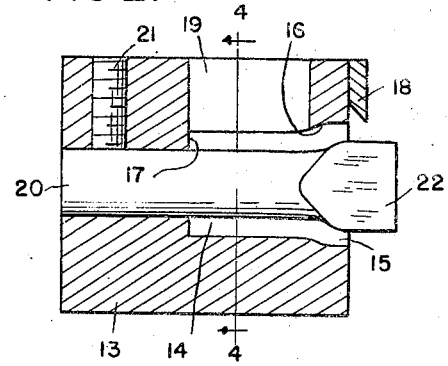
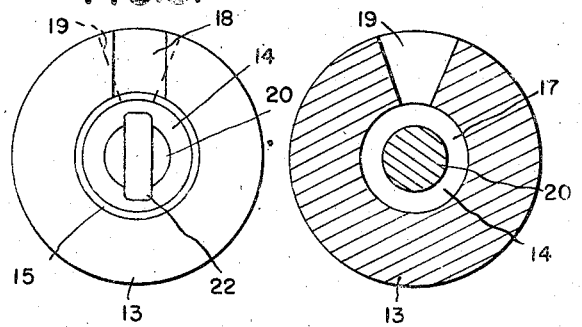
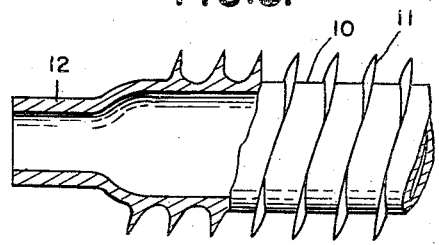
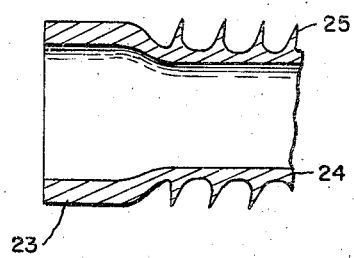
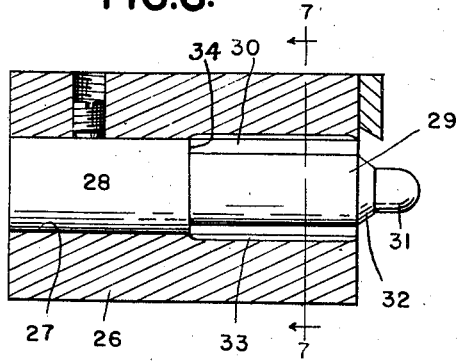
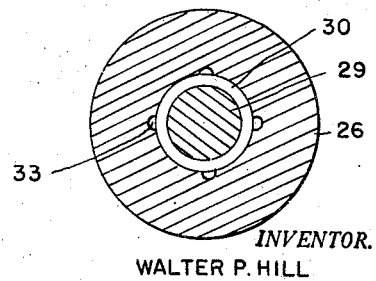
INVENTOR.
WALTER P. HILL
BY
ATTORNEYS Patented July 23, 1946

2,404,575

UNITED STATES PATENT OFFICE 2,404,575

METHOD OF MANUFACTURING FINNED TUBES WITH SUPPORT ENGAGING BEARING PORTIONS

Walter P. Hill, Detroit, Mich., assignor to Calumet and Hecla Consolidated Copper Company, Calumet, Mich., a corporation of Michigan Application June 21, 1943, Serial No. 491,688

6 Claims. (Cl. 29—157.3)

This invention relates generally to finned tubes and refers more particularly to an improved method of manufacturing finned tubes with support engaging bearing portions.

In fabricating numerous different types of equipment requiring finned tubing, it is essential to provide bearing portions on one or both ends of a length of finned tubing in order to support the latter on the frame structure of the equipment. Finned tubing is usually manufactured in substantially continuous lengths by developing the fins from the exterior surface of the tubing, and it is not generally considered practical or feasible to form bearing portions on the tubing during the fin forming operation.

In most instances the finned tubing is cut to length and the bearing portions are formed by any one of several methods. One method employed in the past is to strip the fins from the end portions of the tubing and thereafter expand or reduce the stripped end portions to suit the specified dimensions. One objection to this procedure is that the wall thickness of the tubing is reduced by the stripping operation and the tubing is accordingly weakened at the most critical points.

Another method employed in the past is to fill the cavities between adjacent fins with a suitable bearing metal to provide a bearing having a diameter at least equal to the outside diameter of the fins. This method overcomes the objection of weakening the tubing but, nevertheless, has other objections. In the first place, the process of filling the cavities between adjacent fins with bearing metal is expensive, and the problem of obtaining good adhesion between the metals is presented. In the second place, the above process is not applicable in cases where reduced bearing portions are required at one or both ends of the tubing.

The present invention contemplates overcoming the limitations noted in connection with the above methods by providing a procedure rendering it possible to form either reduced or expanded bearing portions on the tubing without weakening the latter and without adding appreciably to the cost of the tubing. In fact, it is one of the objects of this invention to provide the finned tubing with bearing portions having a wall thickness somewhat greater than the normal wall thickness of the tube and to accomplish this result by a relatively simple, inexpensive procedure.

In accordance with the invention, the fins are stripped from the selected end of the tubing and the latter is expanded and upset to increase the wall thickness of the tubing at the bearing portions. The method of accomplishing the above results will be made more apparent as this description proceeds, especially when considered in connection with the accompanying drawing wherein:

Figure 1 is an elevational view of a finned tube having bearing portions produced in accordance with this invention;

Figure 2 is a longitudinal sectional view of a tool suitable for the purpose of forming the bearing portions on the tubing;

Figure 3 is an end elevational view of the tool shown in Figure 2.

Figure 4 is a cross sectional view taken on the line 4—4 of Figure 2.

Figure 5 is a fragmentary sectional view of a length of tubing showing the result of the stripping, reducing, and upsetting operation;

Figure 6 is a longitudinal sectional view through a modified form of tool.

Figure 7 is a cross sectional view taken on the line 7—7 of Figure 6; and

Figure 8 is a fragmentary sectional view of a finned tube resulting from the tool shown in Figure 6.

Referring first to the embodiment of the invention shown in Figures 1 to 5 inclusive, it will be noted that the reference character 10 indicates a length of finned tubing having fins 11 and having plain or uninterrupted bearing portions 12 of reduced diameter at the extremities thereof. The fins 11 are preferably developed directly from the exterior cylindrical surface of the length of tubing in order to provide an integral construction and insure obtaining maximum efficiency in heat transfer. Any one of a number of methods may be employed for developing the fins from the outer surface of the tubing and, since these methods are well known to the trade, it is believed unnecessary to illustrate or describe the same herein.

It will suffice to point out that finned tubing of the above type is usually produced in substantially continuous lengths and the bearing portions 12 are formed subsequent to cutting the tubing to lengths. In accordance with this invention, the fins at one or both ends of a length of tubing are stripped and the stripped portions are ironed out to form smooth exterior surfaces. During the latter operation the end portions of the tubing are upset to increase the wall thickness of the smooth bearing portions and, at the same time, the latter are reduced or expanded to form the bearing portions to the specified diameter.

In the embodiment of the invention shown in Figures 1 to 5 inclusive, the bearing portions are reduced and Figures 2 to 4 inclusive illustrate a tool suitable for performing the above operations. In detail, the tool comprises a forming die 13, generally cylindrical in contour and having a cavity 14 corresponding in shape to the contour of the bearing portions 12. The cavity is concentric with the axis of the tool and is provided with a pilot portion 15 at the entrant end of the tool having an internal diameter approximating the external diameter of the tubing after the fins 11 are stripped from the tubing.

It is important to note that the pilot portion 15 tapers inwardly at the rear end to form an annular flared shoulder 16 which mergers into the surface of the cavity 14 and serves to connect the pilot 15 with the reduced cavity 14. The shoulder 16 is designed to exert a reducing pressure continuously around the entire circumference of the stock and in this manner progressively heats the stock to a temperature sufficient to enable the latter to be readily worked or shaped. In order to accomplish the above operation, the tool and stock are relatively rotated and fed toward one another by any suitable mechanism not shown herein.

Before the stock is inserted into the pilot portion, however, the fins on the leading end of the tubing are stripped for a predetermined distance along the tubing and this operation may be readily accomplished by providing a cutter 18 at the entrant end of the tool. The cutter is fastened to the front end of the tool in such relationship to the entrant end of the pilot 15 that the fins on the leading end of the stock or tubing are stripped or removed as the latter enters the pilot portion 15. Continued feeding of the tubing or stock into the pilot engages the stock with the shoulder 16 which reduces the stock and heats the latter sufficiently to render it easily workable.

The stock is thoroughly worked in the tool cavity 14 and is prevented from overheating by a relief 19 formed in the tool. The relief area preferably extends for substantially the full length of the tool cavity 14 and enables progressive circumferential deformation of the stock during the forming operation.

Continued feeding of the stock into the tool cavity 14 causes the leading end of the stock to abut the end wall 17 of the cavity and sufficient endwise pressure is thereby exerted on the stock to upset the latter or, in other words, to increase the wall thickness of the stock.

The specified internal diameter of the stock is maintained throughout the above operations by a mandrel 20 secured in the tool by a fastener 21. The mandrel 20 extends through the tool cavity 14 in concentric relation to the latter and is provided with a head portion 22 at the entrant end of the cavity. Upon reference to Figure 2, it will be noted that the head 22 projects beyond the pilot portion 15 of the cavity and serves to direct or guide the stock into the pilot portion 15.

It follows from the foregoing that the tool performs four major operations on the stock as the latter and tool are relatively rotated and fed toward one another. These operations are briefly as follows: (1) the fins are stripped from a predetermined portion of one end of the tube; (2) a reducing pressure is exerted on the stock throughout the circumference of the stock to heat the latter and render the same more easily workable; (3) the stock is thoroughly worked in the cavity 14 of the tool by confining the stock throughout the major portion of its circumference while leaving the remaining portion free to deform into the relief portion 19 of the tool and thereby avoid overheating of the stock; (4) increasing the wall thickness of the stock by exerting an endwise pressure on the stock during the reducing operation; and (5) controlling the internal diameter of the stock by the mandrel 20.

By duplicating the foregoing operations at both ends of a length of stock, a finned tube of the type shown in Figure 5 is provided having smooth cylindrical bearing portions at opposite ends with walls equal in thickness to or greater than the thickness of the original stock.

The embodiment of the invention shown in Figures 6 to 8 inclusive differs principally from the one described above in that the diameter of the bearing portions 23 at the ends of a length of finned tubing 24 is increased to a diameter at least equal to the maximum diameter of the fins 25 on the tubing. The tool for fashioning the finned tubing 24 operates on the same principle as the tool shown in Figure 2 but differs somewhat in construction.

In detail, the tool shown in Figure 6 comprises a body 26 having an axially extending bore 27 for receiving a mandrel 28. The mandrel 28 is fixed in the bore and is reduced at one end as at 29 to form a cavity 30 with the adjacent inner surface of the bore. The dimensions of the cavity 30 approximate the corresponding dimensions of one of the enlarged bearings 23 and the mandrel projects beyond the entrant end of the cavity 30 to form a pilot portion 31 of a diameter somewhat less than the internal diameter of the stock. The pilot portion is connected to the reduced portion 29 of the mandrel 28 by an outwardly flared or tapered shoulder 32 which serves to apply an expanding pressure on the stock as the latter and tool are relatively rotated and fed toward each other. This pressure serves to heat the stock to a temperature which enables the stock to be effectively worked while in the tool cavity 30. If desired, the inner surface of the cavity may be relieved at circumferentially spaced points indicated by the reference character 33 in order to permit the stock to deform during the working operation. As a result, the temperature of the stock is controlled to some extent and the stock is prevented from becoming overheated during the expanding operation.

Continued relative movement of the stock and tool in directions toward one another results in engagement of the end of the stock with a shoulder 34 formed on the mandrel 28 at the juncture of the reduced portion 29 with the mandrel. This shoulder exerts an endwise pressure on the stock sufficient to upset the stock and increase the wall thickness of the resulting bearing portion. As stated above, the outside diameter of this bearing portion is preferably equal to or greater than the maximum diameter of the fins. The purpose of this construction is to facilitate assembly in a construction where it is desired to pass the finned tubing through the opening within which the bearing portions 23 are adapted to be supported.

What is claimed is:

1. The method of producing integral finned tubing with a portion having a plain cylindrical exterior surface comprising relatively rotating and feeding an annularly recessed tool and a length of finned tubing in directions toward each other to effect engagement of one with the other, removing the fins from the leading end of the tubing upon initial engagement of the latter with the tool, and increasing the wall thickness of the stripped portion of the tubing by upsetting said portion against a shoulder in said recess during continued relative movement of the tool and tubing toward each other.

2. The method of producing integral finned tubing with a cylindrical exterior bearing surface comprising relatively rotating and feeding an annularly recessed tool of changing diameter and a length of finned tubing toward each other to effect engagement of one with the other, stripping the fins from the leading end of the tubing upon initial relative movement of the tubing and tool toward each other, and altering the diameter of the stripped end of the tubing upon continued relative movement of the latter and tool toward each other by the changing diameter portion of said recess.

3. The method of producing integral finned tubing with a cylindrical exterior bearing surface comprising relatively rotating and feeding a tool having an annular recess of changing diameter and a length of finned tubing toward each other to effect engagement of one with the other, stripping the fins from the leading end of the tubing upon initial relative movement of the tubing and tool toward each other, altering the diameter of the stripped end of the tubing upon continued relative movement of the latter and tool toward one another, and upsetting the stripped end portion of the tubing to increase the wall thickness thereof by pressure against a shoulder on the tool.

4. The method of producing integral finned tubing with a portion having a plain cylindrical exterior surface comprising relatively rotating and feeding an annularly recessed tool and a length of finned tubing in directions toward each other to effect engagement of one with the other, removing the fins from the leading end of the tubing upon initial engagement of the latter with the tool, confining the stripped portion of the tubing throughout a major portion of its circumference during continued relative movement of the tool and tubing toward one another, and applying an endwise pressure on the stripped portion of the tubing while the latter is confined to increase the wall thickness of the stripped end portion.

5. The method of forming finned tubing with a plain end portion of increased wall thickness comprising relatively rotating about a common axis and axially advancing towards each other, an annularly recessed tool and finned tubing to engage the latter with said recess, stripping the fins from the leading end of said tubing in advance of entering said recess and applying pressure against the advancing end of the tubing to upset the same and increase the wall thickness thereof while confined within said recess.

6. The method of forming finned tubing with a plain end portion of increased wall thickness and changed diameter comprising relatively rotating about a common axis and axially advancing towards each other, a tool having an annular recess of changing diameter and finned tubing to engage the latter with said recess, stripping the fins from the leading end of said tubing in advance of entering said recess and during continued advancement changing the diameter of the tube by the changing diameter of the recess and applying pressure against the end of the tubing to upset the same and increase the diameter thereof while confined within said recess.

WALTER P. HILL.